Dec. 9, 1958 T. MÜNKER 2,863,557
APPARATUS WHICH CONTROLS TEMPERATURE AND
SPEED OF EXTRUDED PRODUCT
Filed Feb. 10, 1953 2 Sheets-Sheet 1

Inventor:
THEODOR MÜNKER

Dec. 9, 1958  T. MÜNKER  2,863,557
APPARATUS WHICH CONTROLS TEMPERATURE AND
SPEED OF EXTRUDED PRODUCT
Filed Feb. 10, 1953  2 Sheets-Sheet 2
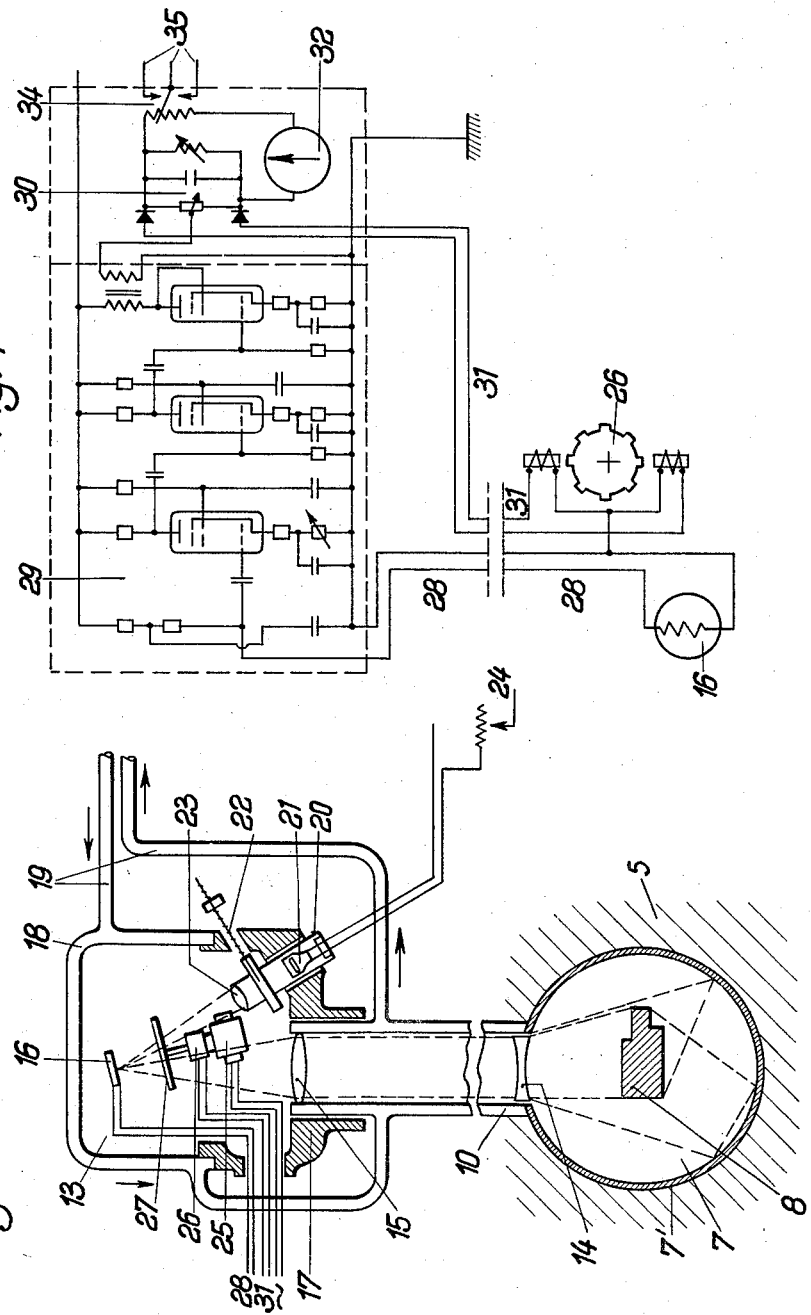
Inventor:
THEODOR MÜNKER

United States Patent Office 2,863,557
Patented Dec. 9, 1958

2,863,557

APPARATUS WHICH CONTROLS TEMPERATURE AND SPEED OF EXTRUDED PRODUCT

Theodor Münker, Langenberg, Germany

Application February 10, 1953, Serial No. 336,037

Claims priority, application Germany February 15, 1952

2 Claims. (Cl. 207—2)

The invention refers generally to the process of plastically shaping materials by extrusion by which a normally preheated slug or ingot is brought into the so-called recipient or die and thereafter pressed by a punch through the die opening the cross-section of which corresponds to the desired extruded shape.

The main object of the present invention is to provide means controlling the extrusion performance so that the highest possible output of a flawless and highly qualified product is obtained in consideration of the changes of the deformability of the material happening during the processing performance.

A further object of the invention is to provide means affording an efficacious apparatus construction especially designed for optimally controlling the extrusion process.

Until now the extrusion process chiefly is performed empirically, or the speed of extrusion is supervised via a speedometer and kept below a limit safe by experience. It is also known that the extrusion process can be performed at a higher speed by cooling the extrusion die, however there is the risk of impairing the quality of the extruded product.

Furthermore all known extrusion processes are based upon the constancy of all conditions influencing the extrusion process. Among these conditions there are the metallurgical composition of the slug, the extruded shape, and the temperatures of the slug, recipient, and die. As it is known failures of the extruded surface are caused by a too rapid extrusion whereby the whole extruded rod mostly becomes useless. Therefore with regard to this risk of waste until now the speed of extrusion is kept low and the capacity of the press voluntarily is not optimally filled out.

The present invention is based upon the realization that the above-mentioned temperatures of slug, recipient, and die influence the temperature of the body or workpiece leaving the die opening and that, therefore, the temperature of the workpiece can be used as a means for measuring or controlling the extrusion process. Therefore it is also possible for a predetermined material and a predetermined extruded shape to prescribe the highest temperature to be allowed of the workpiece leaving the die opening without the risk of any waste or reject. It has been found that the speed of extrusion decisively influences the inner frictions in the material and therefore also the temperature of the workpiece leaving the die opening. Thus this temperature of the body or workpiece is contemplated pursuant to the invention to be a means for measuring the speed of extrusion as such and especially the maximum and simultaneously optimum speed in view of the other conditions of the extrusion process.

Therefore, primarily the invention consists of a process for plastically shaping materials by extrusion and is characterized by the steps of guiding the extruded body or workpiece leaving the die opening through a chamber generally closed except for the inlet and outlet openings for the workpiece and an exit for the chamber radiation, directing by aid of optical means the heat radiation generated in said chamber by the extruded workpiece and passing through said exit to a device responsive to heat radiation and using the output of said device as a means for controlling the conditions of extrusion determining the heat radiation of the extruded workpiece leaving the die opening. A main condition adapted to be controlled is the speed of the workpiece leaving the die opening this speed chiefly influencing the temperature of the extruded body or workpiece as it has been set out further above. Preferably the controlling of the conditions of extrusion is performed in such a way that the temperature of the workpiece leaving the die opening will be kept at a predetermined value. It is especially advantageous that this value is the highest possible of a body or workpiece of still proper quality.

Various additional features of the invention are pointed out in the annexed claims and in the following parts of this specification. For a better understanding of the invention reference is made to the accompanying drawings and their description in which a preferred embodiment of the invention has been illustrated and described.

In the drawings:

Fig. 3 is a cross-section taken along the line III—III of Fig. 2, and Fig. 4 is a wiring diagram of the control system according to the invention.

Figure 1:
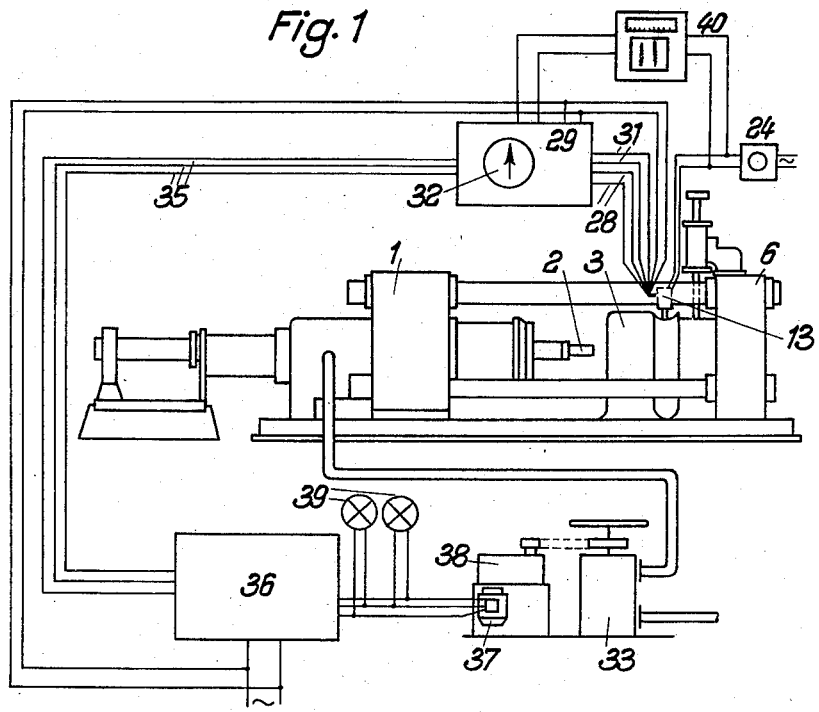
Fig. 1 is a schematic side elevational view of an extrusion press installation embodying a control installation according to the invention.
Figure 2:
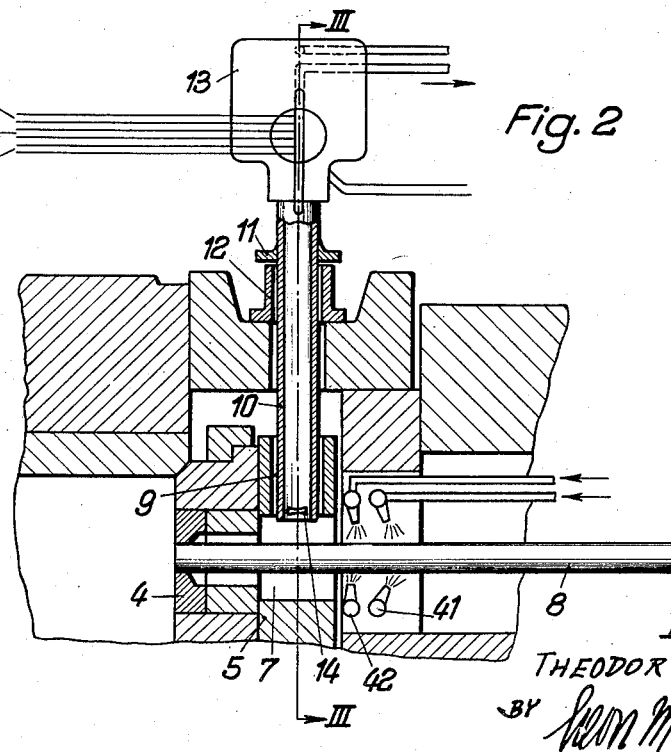
Fig. 2 is a longitudinal section of that part of the extrusion press installation comprising the die and a part of the control installation according to the invention, drawn to an enlarged scale.

With reference to the Figs. 1 to 3 an extrusion press installation adapted to be provided with the control system according to the invention consists of the hydraulic press 1 for supplying material and provided with the ram punch 2, the recipient 3, the die 4, the die holder 5 and the anvil provided with the lock 6.

As it will be especially seen from Figs. 2 and 3, in front of the opening of the shaping die 4 and in the die holder 5 there is a chamber 7 passed by the extruded body or workpiece 8 leaving the die opening. In the upper part of the die holder 5 is an exit opening 9 for the radiation surrounding the head of a tube-like probe 10. This probe forms a channel and consists of a copper tube preferably provided with double walls and a supporting flange 11 and mounted in a measuring head 13. The supporting flange 11 rests on a bracket 12 of the press. The tube serves as the envelope of an optical system consisting of a dispersing lens 14 mounted in the head of the tube adjacent the chamber 7 and a collecting lens 15 mounted in the end of the tube adjacent the measuring head 13. As it has schematically been illustrated in Fig. 3 by dotted lines, the optical system collects the heat radiation emanating from the workpiece 8 and collected by the chamber 7 and directs it to the device 16 responsive to heat radiation. Preferably, the inner wall of the chamber 7 is lined with a layer 7' well reflecting heat radiation and consisting of say bright aluminum. The chamber 7, thus, constitutes in essence the internally highly reflective hollow member of a light-measuring instrument commonly known as an Ulbricht globe photometer. Although the chamber 7 has been illustrated schematically as having a non-spherical interior surface, it will be readily appreciated that such chamber may obviously have the form of a sphere as is generally the case in an Ulbricht photometer. The arrangement is advantageous and highly efficacious in that the chamber 7 allows for a total utilization of the heat radiation emanating from all of the surfaces of the multifaced workpiece or body 8. That is, not merely the radiation emanating from one surface directly facing the dispersing lens 14, but the radiation emanating from all of the various surfaces of the body or workpiece 8 will be reflected by the inner curved surface of the chamber 7 and thereby effectively sensed and reflected toward channel means 10. In this way it is possible to achieve a high degree of accurate measurement and control for extrusion press rams even though the body or workpiece is of irregular shape and has a plurality of faces.

The measuring head 13 consists of the chassis 17 and the cover 18. The cover 18 has double walls like the tube 10 and, therefore, can be cooled together with said tube by a cooling system 19 schematically illustrated.

The chassis 17 carries the standard radiating device installation 20 chiefly consisting of the standard radiating device 21, e. g. a body electrically heated, a device 22 for controlling the standard radiation, e. g. a controllable diaphragm or filter, and a collecting lens 23. The heating of the standard radiating device may be controlled by a control device 24. The standard radiating device may consist of the same material as the extruded material.

Furthermore on the chassis 17 there is mounted an interrupter including a motor 25 carrying on its shaft a generator 26 and a slotted disk 27. This disk 27 is mounted and designed in a way to alternatively allow the passage of the heat radiation emanating from the measuring chamber 7 or from the standard radiating device 21 respectively to move towards the radiation sensitive device 16. This device 16 may consist of a known photocell or photoresistance and delivers electric impulses corresponding with the received radiation by the wires 28 to the inlet of a three stage amplifier 29, see Fig. 4, the outlet of which is connected to a phase-bridge 30. This phase-bridge 30 is also connected by the wires 31 to the field-poles of the generator 26. The rotor of this generator has poles equal in position and number with the slots of the disk 27. The purpose of the generator 26 is to enable an "addition" or "subtraction" of the amplified photocell output current with reference to a mean current to be attained. In other words, the generator output current is applied across the bridge, and the output of the bridge will vary in dependence on the phase relationship between this generator output current and the photocell output current after the latter has been amplified and transformed into an alternating current. By this known arrangement the zero-indicator device 32 is able to indicate positive as well as negative differences between the chamber radiation and the standard radiation. Thus by manipulating for instance the press-fluid valve 33 the operator of the extrusion press will be able to increase the speed of extrusion if the chamber radiation is too low and to reduce said speed if said radiation is too high.

Furthermore the outlet of the phase-bridge 30 is connected to a relay device 34 actuating by way of the wire connection 35 a reversing relay installation 36 for the servomotor 37 according to the positive or negative sense of deviation of the chamber radiation from the standard radiation. Merely by way of example, the reversing relay system 36 may be analogized to a double-throw switch and is so connected to the servomotor 37 as to actuate the latter in one sense or another depending on whether the phase relationship between the amplified photocell output current and the generator output current is one of lead or lag, (i. e., positive or negative), or alternatively to leave the servomotor at rest when there is no phase difference between the currents. Such reversing relay systems are known in the art and specific illustration thereof is omitted for the sake of clarity. The servomotor 37 accordingly controls the above-mentioned press-fluid valve 33. The relay device 34 also may control optical or acoustical warning signals 39.

For better supervision by the operator of the extrusion press installation and for statistical purposes advantageously there may be provided a registering device 40 registering the speed of extrusion and the temperature of the workpiece leaving the die opening besides the other data of operation. The recorder or registering device 40 is of conventional construction and generally includes a record-receiving surface moved in one direction in accordance with the passage of time while suitable writing members are moved transversely to this direction in accordance with the punch or ram speed and the temperature of the extruded material. As in the case of the reversing relay system 36, specific illustration of the recorder and the manner of its connection into the circuit has been omitted for the sake of clarity.

The before-described control installation may also be used for determining the highest allowable value of the heat radiation of the extruded workpiece assuring absence of failures for a material of predetermined composition or for a predetermined extruded shape or for both conditions by a test extrusion.

The use of shutters of filters in the path of the standard radiation or eventually in the path of the chamber radiation allows quickly adapting the control system to different materials or extruded shapes or both without far-going changes of construction and operation. Thus the reliability in operation of the installation is essentially improved.

All in all, the invention especially gives the following advantages:

Due to the possibility of determining and continuously supervising the limit conditions for flawless extrusion by the invention the far-going reduction of the desired speed of extrusion hitherto needed for reasons of safety essentially can be diminished thus improving the output of an extrusion press installation.

When extruding difficult shapes or special materials such as aluminium or its alloys the surface of the extruded workpiece is sometimes roughened and thus of bad quality. Since this roughening obviously is caused by the material sticking to the die it only can be avoided by reducing the speed of extrusion. Now since according to a known physical law a rough surface gives a stronger radiation than a smooth one, in case of a rough surface of the extruded workpiece the control device according to the invention will indicate a higher chamber radiation, which the operator accordingly will compensate by reducing the speed of extrusion. Therefore the control method according to the invention practically will save a special supervision of the surface conditions of the extruded workpiece.

A further advantage consists in the fact that the extrusion is preformed under conditions of temperature more constant than hitherto so that the extruded workpiece has a structure of constant homogeneity throughout its length. Under the known conditions of extrusion processing especially the beginning of an extruded workpiece had less favorable structural qualities than its end.

Due to constant temperature throughout its length according to another feature of the invention the workpiece leaving the die opening is adapted to immediately being subjected to an additional temperature-dependent process of treatment. Thus for instance, an extruded workpiece made of special material such as aluminium alloys immediately can be tempered. In this way there are saved time of operation as well as heat input namely for the repeated heating up of the extruded workpiece normally cooled down for transport towards the tempering installation. This feature of invention is shown in Fig. 2. The workpiece 8 leaving the measuring chamber 7 passes through a ring-shaped nozzle 41 jetting the tempering means, e. g. water, onto the workpiece. Preferably the measuring chamber 7 is protected against water, dust and steam by a pillow of compressed air generated by a second ring-shaped nozzle device 42.

The method according to the invention can be used in connection with all kinds of processes of plastically shaping materials where during the processing there will happen an increase of the temperature of the workpiece influencing the process of shaping.

While the preferred embodiment of the invention has been shown and herein described, it will be understood that the same is capable of modification without departure from the general scope and spirit of the invention as defined in the claims.

Having thus described the invention, what is claimed as new and desired to be secured by Letters Patent, is:

1. An apparatus for regulating the extrusion of a length of a multifaced body made of extrudable material and passed through die means; comprising ram means for extruding said material through said die means to obtain said multifaced body, a spherical-shaped chamber positioned beyond said die means and remote from said ram means, said spherical-shaped chamber being provided with passageways for directing said multifaced body through the interior of said chamber, said chamber being located directly in contact with said die means and having an inner surface highly reflective of heat radiation, said inner surface being constructed to reflect the total radiation emanating from all the faces of said multifaced body during the course of the passage of the latter through the interior of said chamber, channel means extending from said chamber and communicating therewith, heat radiation responsive means communicating with said channel means for receiving heat radiation from said chamber, a standard body disposed adjacent said radiation responsive means, means for heating said standard body to thereby cause the latter to emit heat radiations in the direction of said radiation responsive means, interrupter means disposed in the paths of said heat radiations emanating from said standard body and from said chamber directed to said radiation responsive means, said interrupter means alternately permitting heat radiations to arrive at said radiation responsive means from said body when within said chamber and from said standard body when heated, and power means operatively connected with said radiation responsive means and said ram means, whereby when said standard body assumes a predetermined temperature the rate of extrusion of said material of said body from said die means is automatically adjusted in accordance with the difference in the heat radiations from said standard body and from said body of material located within said chamber, to thereby maintain a constant temperature of said material during extrusion thereof so that the body thus extruded remains homogeneous throughout.

2. An apparatus according to claim 1, said body of extruded material being directed approximately centrally of and through said chamber, the axis of said channel means being disposed approximately perpendicular to the path along which said body of extruded material moves upon leaving said die means.

References Cited in the file of this patent

UNITED STATES PATENTS

| | | |
|---|---|---|
| 338,363 | Reese | Mar. 23, 1886 |
| 1,951,426 | Littler | Mar. 20, 1934 |
| 2,051,781 | Brown | Aug. 18, 1936 |
| 2,064,589 | Convers | Dec. 15, 1936 |
| 2,097,502 | Southgate | Nov. 2, 1937 |
| 2,156,895 | Godat | May 2, 1939 |
| 2,166,824 | Runaldue | July 18, 1939 |
| 2,189,270 | Pineo | Feb. 6, 1940 |
| 2,207,405 | Jacobson | July 9, 1940 |
| 2,244,732 | Schmitt | June 10, 1941 |
| 2,411,971 | MacMillin et al. | Dec. 3, 1946 |
| 2,540,146 | Stober | Feb. 6, 1951 |
| 2,566,854 | Rhodes | Sept. 5, 1951 |
| 2,589,323 | Ashley et al. | Mar. 18, 1952 |
| 2,596,988 | Katz | May 20, 1952 |